United States Patent
Chiang et al.

(10) Patent No.: US 7,633,442 B2
(45) Date of Patent: Dec. 15, 2009

(54) SATELLITE COMMUNICATION SUBSCRIBER DEVICE WITH A SMART ANTENNA AND ASSOCIATED METHOD

(75) Inventors: Bing A. Chiang, Melbourne, FL (US); Inhyok Cha, Melbourne, FL (US); Michael J. Lynch, Merritt Island, FL (US); Thomas E. Gorsuch, Merritt Island, FL (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 11/143,182

(22) Filed: Jun. 2, 2005

(65) Prior Publication Data

US 2005/0285784 A1 Dec. 29, 2005

Related U.S. Application Data

(60) Provisional application No. 60/576,641, filed on Jun. 3, 2004.

(51) Int. Cl.
*G01S 3/16* (2006.01)
*H04B 7/04* (2006.01)

(52) U.S. Cl. .................... 342/432; 455/277.2
(58) Field of Classification Search ............... 342/374, 342/432; 455/277.1, 277, 277.2
See application file for complete search history.

(56) References Cited

U.S. PATENT DOCUMENTS

| | | | | |
|---|---|---|---|---|
| 3,846,799 A | | 11/1974 | Gueguen | ............... 343/833 |
| 4,700,197 A | * | 10/1987 | Milne | ................. 343/837 |
| 5,528,247 A | * | 6/1996 | Nonami | ............... 342/357.1 |
| 5,767,807 A | * | 6/1998 | Pritchett | ................ 342/374 |
| 5,797,083 A | * | 8/1998 | Anderson | ................. 455/25 |
| 5,905,473 A | | 5/1999 | Taenzer | ................. 343/834 |
| 5,983,071 A | * | 11/1999 | Gagnon et al. | ............... 725/72 |

(Continued)

FOREIGN PATENT DOCUMENTS

EP 0172626 2/1986

(Continued)

OTHER PUBLICATIONS

Miura, R. et al "Beamforming Experiment with a DBF Multibeam Antenna in a Mobile Satellite Environment" IEEE Trans. On Antennas and Propagation, vo. 45, No. 4, Apr. 1997.*

(Continued)

*Primary Examiner*—Gregory C Issing
(74) *Attorney, Agent, or Firm*—Allen, Dyer, Doppelt, Milbrath & Gilchrist, P.A.

(57) ABSTRACT

A satellite communication subscriber device includes a smart antenna for generating antenna beams for receiving signals from at least one satellite, and a receiver. The receiver includes a quality metric module for calculating a quality metric on the signals received by each antenna beam. A beam selector is coupled to the smart antenna for selecting the antenna beams. An antenna steering algorithm module runs an antenna steering algorithm for operating the beam selector for scanning the antenna beams, receiving the calculated quality metrics from the receiver for each scanned antenna beam, and comparing the calculated quality metrics. The algorithm selects one of the scanned antenna beams based upon the comparing for continuing to receive signals from the at least one satellite.

22 Claims, 4 Drawing Sheets

U.S. PATENT DOCUMENTS

| | | | |
|---|---|---|---|
| 6,100,843 A * | 8/2000 | Proctor et al. | 342/368 |
| 6,229,486 B1 * | 5/2001 | Krile | 343/700 MS |
| 6,307,507 B1 | 10/2001 | Gross et al. | 342/373 |
| 6,377,211 B1 * | 4/2002 | Hsiung | 342/359 |
| 6,414,624 B2 * | 7/2002 | Endo et al. | 342/70 |
| 6,633,258 B2 * | 10/2003 | Lindenmeier et al. | 342/374 |
| 6,640,085 B1 | 10/2003 | Chatzipetros et al. | 455/3.02 |
| 6,792,290 B2 * | 9/2004 | Proctor et al. | 455/562.1 |
| 6,917,337 B2 * | 7/2005 | Iida et al. | 343/702 |
| 6,946,993 B2 * | 9/2005 | Seo et al. | 342/374 |
| 2003/0013408 A1 | 1/2003 | Blodgett et al. | 455/3.01 |

FOREIGN PATENT DOCUMENTS

| | | |
|---|---|---|
| JP | 07-079479 | 3/1995 |
| JP | 9-504934 | 5/1997 |
| JP | 10-145260 | 5/1998 |
| JP | 2004-535722 | 11/2004 |
| KR | 20020070896 | 9/2002 |

OTHER PUBLICATIONS

Ohira et al., Electronically Steerable Passive Array Radiator Antennas for Low-Cost Analog Adaptive Beamforming, 0-7803-6345-0/00, 2000, IEEE.

Scott et al., Diversity Gain From a Single-Port Adaptive Antenna Using Switched Parasitic Elements Illustrated with a Wire and Monopole Prototype, IEEE Transactions on Antennas and Propagation, vol. 47, No. 6, Jun. 1999.

King, The Theory of Linear Antennas, pp. 622-637, Harvard University Press, Cambridge, Mass., 1956.

Lo et al., Antenna Handbook: Theory, Applications and Design, pp. 21-38, Van Nostrand Reinhold Co., New York, 1988.

* cited by examiner

SATELLITE COMMUNICATION SUBSCRIBER DEVICE WITH A SMART ANTENNA AND ASSOCIATED METHOD

RELATED APPLICATION

This application claims the benefit of U.S. Provisional Application Ser. No. 60/576,641 filed Jun. 3, 2004, the entire contents of which are incorporated herein by reference.

FIELD OF THE INVENTION

The present invention relates to the field of satellite communication subscriber devices, and more particularly, to a smart antenna providing angular diversity with respect to signals received from satellites and/or terrestrial repeaters to select a preferred signal source.

BACKGROUND OF THE INVENTION

In satellite digital radio systems audio signals are digitized and transmitted from satellites using digital communication techniques, such as digital modulation and coding. A satellite digital radio system offers benefits that are not available with conventional AM or FM analog radio systems. Digital compression techniques allow satellite digital radio systems to provide high-quality audio signals, even when the signals are received in a moving vehicle. High-quality audio reproduction is generally not possible with conventional AM or FM analog radio systems.

Particularly troublesome for satellite digital radio reception is signal degradation due to multipath fading, which is essentially a variation in RF signal levels due to multiple random signal reflections. Although baseband digital transmission techniques, such as equalization and modulation, can lower the impact of multipath fading, degradations still exist.

In particular, serious signal degradations may occur when a satellite digital radio receiver is indoors or in narrow inter-building alleys. The digital signals from orbiting satellites may not be acquired with a good line-of-sight path. Consequently, numerous random reflections of the satellite-originated signals, i.e., the multipaths, may be the only signals that the satellite digital radio receiver radio can receive.

To reduce the impact on radio reception by degradations such as multipath fading and other types of signal blockage, several transmission redundancy techniques, collectively called diversity techniques, are used in current satellite digital radio systems. A first technique is satellite spatial diversity in which two or more satellites transmit identical signals from widely spaced apart locations. A second technique is frequency diversity in which different satellites transmit the same signals at different frequency bands. A third technique is time diversity in which different satellites transmit the same signals at slightly different times. In hard-to-reach areas, such as dense urban centers or in signal-blocking structures such as tunnels, the satellite digital radio signals are re-transmitted at separate frequencies using terrestrial repeaters.

Current subscriber device antenna systems use omni-directional antennas that are adequate when relatively strong line-of-sight signals are available from either the satellites or from the terrestrial repeaters. However, omni-directional antennas perform very poorly in multipath-rich environments, such as inside buildings or in narrow inter-building locations in dense urban areas. A single fixed beam antenna has no way of determining the direction from which a reflected radio signal can be best received, and cannot be pointed to more accurately detect and receive a signal in any particular direction.

Current antenna systems also use dual element antennas commonly referred to as diversity antennas. Although performance can be improved in certain situations, the dual element antennas can also be susceptible to multipath fading due to the symmetrical nature of the hemispherical lobes formed by the antenna pattern. A signal reflected in a reverse direction from its origin can be received with nearly as much power as the original signal that is directly received. That is, if the original signal reflects from an object beyond or behind the intended receiver (with respect to the sender) and reflects back at the intended receiver from the opposite direction as the directly received signal, a phase difference in the two signals can create a multipath fading situation.

It is also common to have fixed directional high gain antennas pointing toward the satellite, i.e., typical outdoor antennas. Since these antennas have a fixed pointing angle, they can not adapt well to multipath environments where the best signals may be a reflected signal which is not in the direction of the direct satellite path.

Another problem is the reception of signals that have been retransmitted by terrestrial repeaters, in which these signals may be interfered with by nearby transmitting systems. Although the signals may be separated in the frequency spectrum, adjacent channels may still experience interference from nearby transmitter stations. Consequently, omni-directional antennas and dual element diversity antennas are not adequate for receiving signals in multipath environments.

SUMMARY OF THE INVENTION

In view of the foregoing background, it is therefore an object of the present invention to improve the reception of transmitted signals by a satellite communication subscriber device from satellites and/or terrestrial repeaters in a multipath-rich environment.

This and other objects, features, and advantages in accordance with the present invention are provided by a satellite communication subscriber device comprising a smart antenna for generating a plurality of antenna beams for receiving signals from at least one satellite, and a receiver comprising a quality metric module for calculating a quality metric on the signals received by each antenna beam.

A beam selector is coupled to the smart antenna for selecting the plurality of antenna beams. An antenna steering algorithm module runs an antenna steering algorithm for operating the beam selector for scanning the plurality of antenna beams, receiving the calculated quality metrics from the receiver for each scanned antenna beam, and comparing the calculated quality metrics. The algorithm selects one of the scanned antenna beams based upon the comparing for continuing to receive signals from the at least one satellite.

The calculated quality metrics may be compared to a low quality metric threshold, and for calculated quality metrics falling below the low quality metric threshold, the corresponding antenna beams associated therewith are ignored when performing the selecting. The calculated quality metrics may comprise a received signal strength indicator or a signal-to-noise ratio of the received signals. Alternatively, the calculated quality metrics may comprise an error rate or a data throughput of the received signals.

In a first embodiment, the plurality of antenna beams may comprise a plurality of directional antenna beams and an omni-directional antenna beam. In a second embodiment, the plurality of antenna beams may comprise orthogonal polarization beams, i.e., linear or circular. In addition, a third embodiment may comprise a combination of the first and second embodiments.

The antenna steering algorithm may operate the beam selector for scanning the plurality of antenna beams. The smart antenna may comprise a switched beam antenna or a phased array antenna or any other antenna architecture that provides the selectable beams, such as a dual orthogonal polarization antenna or an antenna that provides selectable linear and circular beams.

In addition, the antenna steering algorithm may operate the beam selector for selecting the omni-directional antenna beam before scanning the plurality of directional antenna beams, and also for receiving a calculated quality metric from the receiver for the signals received by the omni-directional antenna beam, and for comparing the calculated quality metric to a scan threshold for determining if the plurality of directional antenna beams are to be scanned.

In addition, the antenna steering algorithm may operate the beam selector for sequentially selecting all or a subset of the antenna beams for receiving a calculated quality metric from the receiver for the signals received, and for comparing the calculated quality metric to a scan threshold for determining which directional antenna beams are to be scanned.

The smart antenna advantageously generates directional antenna beams in an azimuth direction and in an elevation direction. Since the smart antenna may also receive signals from at least one terrestrial repeater, the smart antenna allows the beam selector to select the directional antenna beams in the azimuth and elevation direction for receiving signals from the at least one terrestrial repeater, and to select the directional antenna beams in the azimuth and elevation direction for receiving signals from the at least one satellite.

The satellite communication subscriber device may further comprise a transmitter for transmitting signals from the smart antenna. The antenna steering algorithm may also operate the beam selector during the scanning so that only a portion of the plurality of antenna beams are scanned based upon a known direction of the at least one satellite.

By providing non-symmetrical directionality and resultant angular diversity in either azimuth or elevation or both azimuth and elevation, the satellite communication subscriber device current invention addresses not only the problems of the non-availability of signal diversity of the single element omni-directional antenna system but also of the inability to fight random multipath fading due to the fixed symmetrical beam pattern of the dual element diversity antenna system. Moreover, the antenna beams may be steered away from undesired interferers such as neighboring broadcast signals and toward desired transmitter sources.

Another aspect of the present invention is directed to a method for operating a satellite communication subscriber device as described above. The method comprises operating the beam selector for scanning the plurality of antenna beams, receiving the calculated quality metrics from the receiver for each scanned antenna beam, comparing the calculated quality metrics, and selecting one of the scanned antenna beams based upon the comparing for continuing to receive signals from a satellite or terrestrial repeater.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notations are used to indicate similar elements in alternative embodiments.

Figure 1:
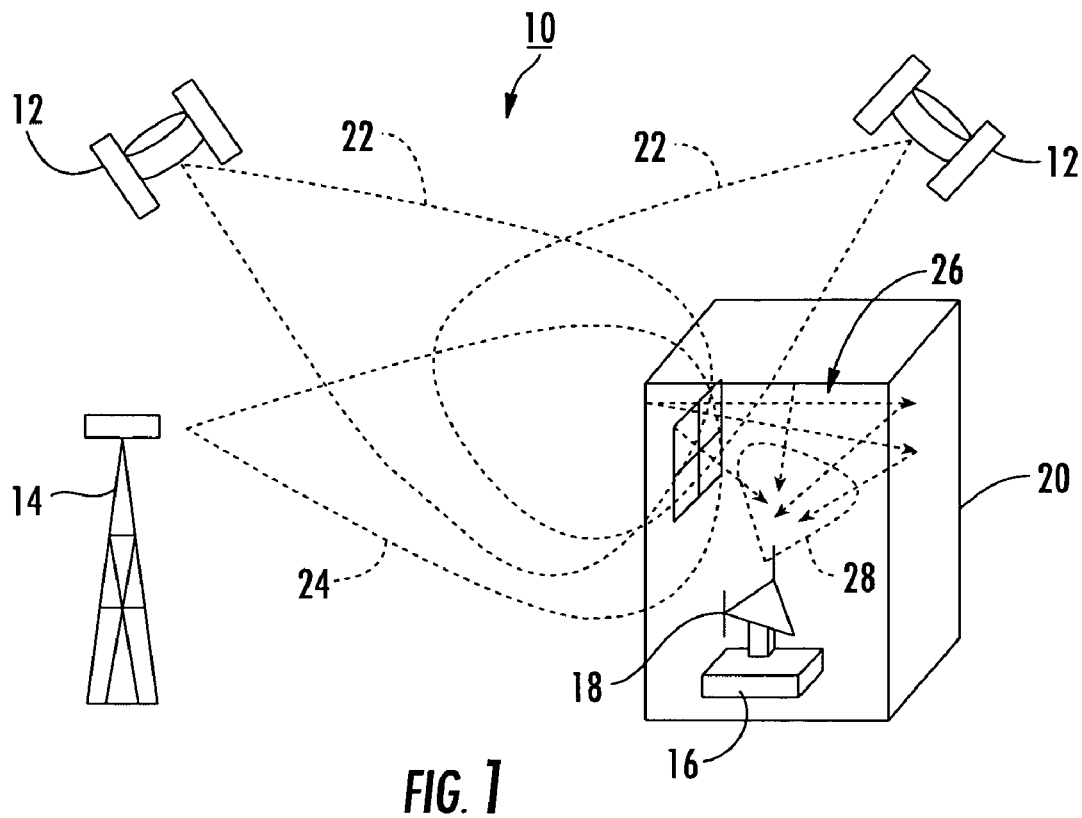
FIG. 1 is a schematic diagram of a satellite digital radio system including a satellite communication subscriber device in accordance with the present invention.
Figure 2:
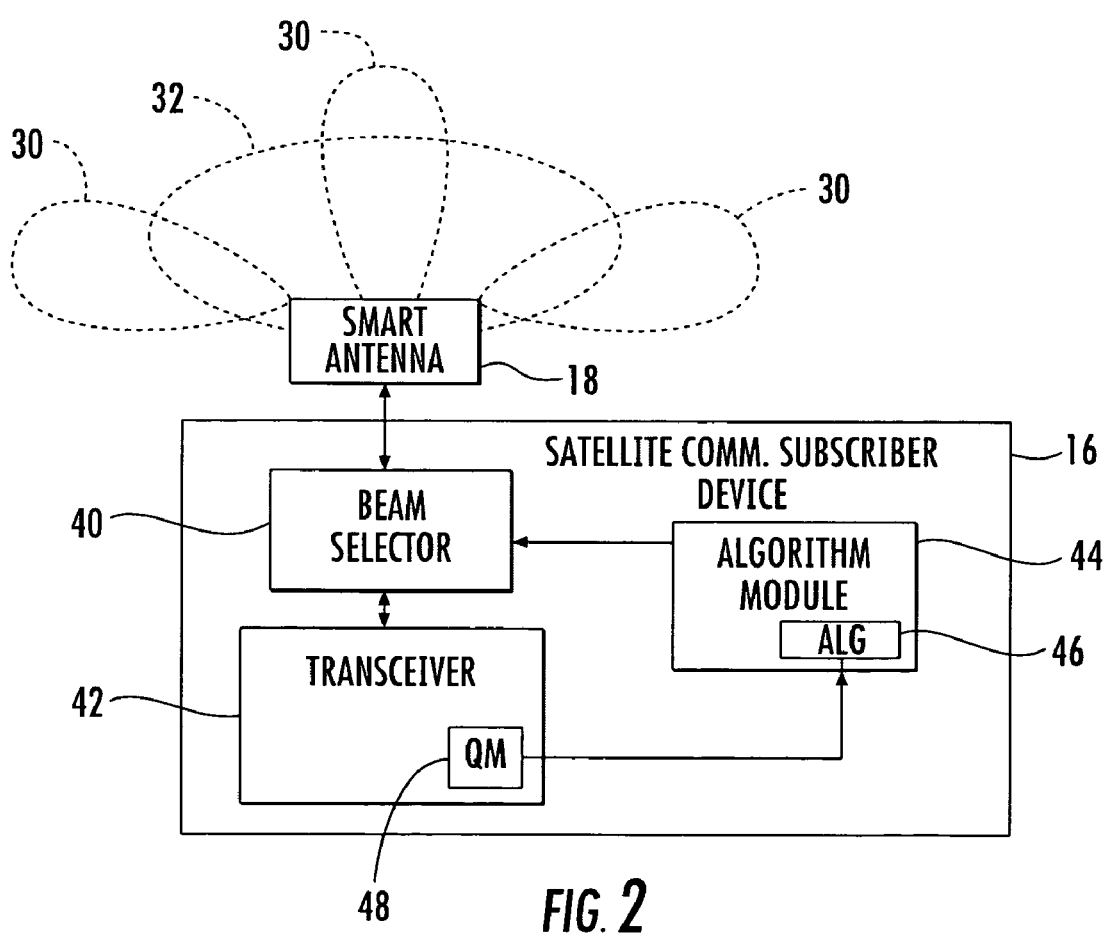
FIG. 2 is a block diagram of the satellite communication subscriber device illustrated in FIG. 1.

Referring initially to FIGS. 1 and 2, a satellite digital radio system 10 will be discussed. The satellite digital radio system 10 includes one or more satellites 12 transmitting digital radio signals to a satellite communication device, such as a satellite communication subscriber device 16. The subscriber device 16 may be mobile or stationary. Terrestrial repeaters 14 may also be used for re-transmitting the digital radio signals. The subscriber device 16 is operating with a subscriber based smart antenna 18. The smart antenna 18 may be a switched beam antenna or a phased array antenna, as will be discussed in greater detail below.

The subscriber device 16 and the smart antenna 18 are compatible with at least one of a variety of digital radio satellites, such as a Sirius radio satellite, an XM radio satellite or a WorldSpace satellite, for example. When receiving radio signals from any one of these digital radio satellites, the subscriber device 16 only needs to operate in a receive-only mode. However, in bi-directional satellite communication systems, the subscriber device 16 is also able to transmit signals to the satellites 12 and/or the terrestrial repeater 14 as readily appreciated by those skilled in the art.

Since the subscriber device 16 is operating within a building 20, this results in a multipath-rich signal environment. In the illustrated example, the satellites 12 are at an elevation angle of approximately 45 to 60 degrees with respect to the subscriber device 16. The antenna beams 22 from the two satellites 12 direct the transmitted signals into the building 20 at different angles. In addition, the signals from the satellites 12 are re-transmitted by the terrestrial repeater 14 via an omni-directional antenna beam or an azimuthally directional antenna beam 24 into the building 20.

Inside the building 20 and around the subscriber device 16, a plurality of reflected signal paths 26 for the transmitted signals is depicted, i.e., the subscriber device experiences multipath fading in receiving the signals. The illustrated smart antenna 18 generates a directional antenna beam 28 to receive the optimal signals based upon the multipath reflected signals.

The signals from the satellites 12 may provide spatial diversity, frequency diversity through the use of different frequency bands, and time diversity through the use of time delays. As will be discussed in greater detail below, the satellites 12 and terrestrial repeater 14 may operate on a shared spectrum (using, e.g., time division multiplexing) or on different spectrum (using e.g., frequency division multiplexing). Current satellite systems use TDM-QPSK modulation for the satellite transmission of the signals. The terrestrial repeater 14 uses TDM-COFDM modulation for the terrestrial retransmissions of the signals.

The antenna beams generated by the smart antenna 18 include directional beams 30 and an omni-directional beam 32. In addition, the antenna beams may comprise orthogonal polarization beams, i.e., linear or circular. In addition to the smart antenna 18 being a phased array antenna or a switched beam antenna, the smart antenna may comprise any other antenna architecture that provides the selectable beams, such as a dual orthogonal polarization antenna or an antenna that provides selectable linear and circular beams.

The subscriber device 16 includes a beam selector 40 coupled to the smart antenna 18 for selecting the antenna beams 30, 32. When the smart antenna 18 is a phased array antenna, more than one directional antenna beam can be generated at a time.

A transceiver 42 is coupled to the beam selector 40 for receiving the signals from the satellites 12 and the terrestrial repeater 14. An antenna steering algorithm module 44 runs an antenna steering algorithm 46 for determining which antenna beam provides the best reception. The selected antenna beam providing the best reception corresponds to one of the satellites 12 or to the terrestrial repeater 14. Since the antenna beams may also have different polarizations, selection of the best antenna may be based upon which polarization provides the best reception.

In lieu of the antenna steering algorithm module 44 being separate from the transceiver 42 and the beam selector 40 as illustrated, the module may reside in the beam selector or the transceiver, as readily appreciated by those skilled in the art. The antenna steering algorithm 46 operates the beam selector 40 for scanning the plurality of antenna beams 30, 32 for receiving signals from the satellites 12 and the terrestrial repeater 14.

A quality metric module 48 in the transceiver 42 calculates quality metrics for the signals received by each scanned antenna beam, and the quality metrics are then compared by the antenna steering algorithm 46. Based upon the comparing, one of the scanned antenna beams is selected for continuing to receive signals from the satellite 12 or the terrestrial repeater 14 associated therewith. Since the scanned antenna beams may have different polarizations, the quality metrics are also determined based upon reception with the different polarizations.

The calculated quality metrics may also be compared to a low quality metric threshold, and for calculated quality metrics falling below the low quality metric threshold, the corresponding antenna beams associated therewith are ignored when performing the selecting. The calculated quality metric may be a signal quality metric.

Signal quality metrics include the received signal strength indicator (RSSI) or the signal-to-noise ratio (SNR) of the received signals. Alternatively, the calculated quality metric may be a link quality metric, such as data throughput and error rates of the received signals. In addition, the calculated quality metric may be a combination of one of the signal quality metrics and one of the link quality metrics.

Figure 3:
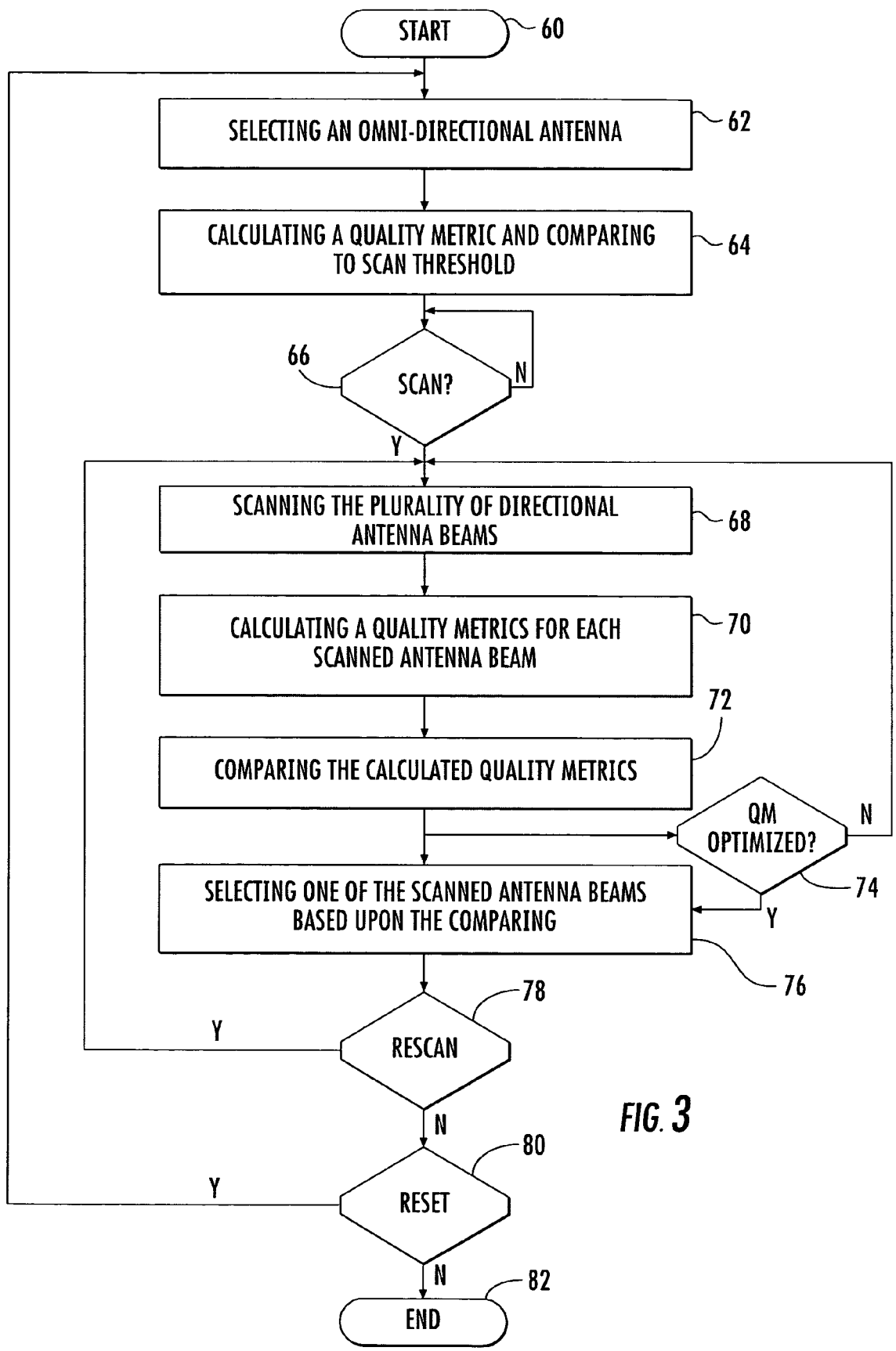
FIG. 3 is a flowchart for operating the satellite communication subscriber device illustrated in FIG. 1.

A method for operating the smart antenna 18 will now be discussed in reference to the flowchart illustrated in FIG. 3. From the start (Block 60), the omni-directional antenna beam 32 is selected at Block 62 to initially receive the transmitted signals. A quality metric is calculated for the signals received via the omni-directional antenna beam 32, and the calculated quality metric is compared to a scan threshold at Block 64. A decision is then made in Block 66 as to whether or not to perform a scan through the plurality of directional antenna beams 30. In case the smart antenna 16 can not generate an omni-directional antenna beam 32, then one of the directional antenna beams is used selected 30.

If the scan decision is yes, then the plurality of directional antenna beams 30 are scanned in Block 68, and a quality metric is calculated on the signals received by each scanned antenna beam in Block 70. The calculated quality metrics are compared in Block 72.

After the directional antenna beams 30 have been scanned, another decision is made in Block 74 to determine if the calculated quality metrics have been optimized. If the smart antenna 18 is a switched beam antenna, optimization is based upon selecting the scanned antenna beam receiving the signals having the highest quality metric In addition, the calculated quality metrics may be compared to a low quality metric threshold as stated above. For the calculated quality metrics falling below the low quality metric threshold, the corresponding antenna beams associated therewith are ignored when performing the scanning.

If the smart antenna 18 is a phased array antenna, a switched beam antenna or a simultaneous multi-polarization antenna, then more than one antenna beam can be generated at a time. In this case, multiple antenna beams can be generated at the same time to receive different multipath signals. Optimizing the quality metrics is based upon phase-aligning selected antenna beams resulting in receiving the signals having the highest quality metric. Since the received signals are vector signals respectively having a phase and amplitude, the signals either add or subtract with one another, as readily appreciated by those skilled in the art. This is particularly so when the satellites 12 and the terrestrial repeater 14 operate on the same channel.

As an example, the scanned antenna beam receiving the signals having the highest quality metric may be further optimized when the smart antenna 18 also receives signals from 2 other antenna beams, for example, wherein these 2 other antenna beams add to (instead of subtract from) the signals having the highest quality metric. Depending on the number of antenna beams that can be generated, a predetermined combination of antenna beams may be combined to see which combination phase aligns the received multipath signals.

If the quality metrics have been optimized, then one of the directional antenna beam(s) is selected in Block 76, then communications is continued with the corresponding satellite 12 or terrestrial repeater 14. In Block 78, a determination is made for determining whether or not a rescan needs to be performed. This rescan may be based upon a timed periodic rescan, or the signals received via the selected antenna beam(s) falls below a rescan threshold. In some cases, it may be desired to reset the smart antenna 18 in Block 80 and start all over with the omni-directional antenna beam 32. For instance, the subscriber device 16 may have been powered off and then powered back on, or the subscriber device is traveling through a tunnel and needs to receive signals from the terrestrial repeater 14. The method ends at Block 82.

Another advantage of generating multiple antenna beams at the same time with the phased array smart antenna is when different channels are being used by the satellites 12 and the terrestrial repeater 14. For example, one of the satellites 12 is transmitting signals on channel 1, the other satellite is transmitting signals on channel 2 and the terrestrial repeater 14 is transmitting signals on channel 3. By generating 3 antenna beams at the same time, each antenna beam may be directed toward a respective source, and based upon the calculated quality metrics, the antenna beam providing the signals having the highest quality metric is selected. In addition, the directional antenna beams 30 searched or scanned may be a limited set based upon known directions of the satellites 12 and the terrestrial repeater 14.

Figure 4:
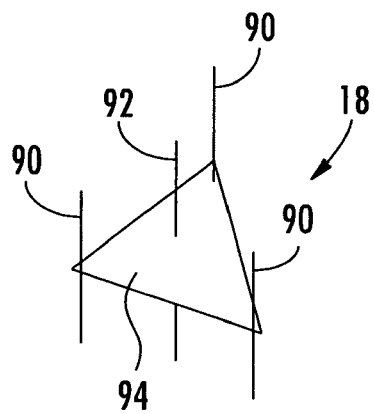
FIG. 4 is a schematic diagram of one embodiment of the smart antenna illustrated in FIG. 1.

Different embodiments of the smart antenna 18 will now be discussed with reference to FIGS. 4-8. One embodiment of the smart antenna 18 comprises four antenna elements 90, 92 placed on a planar triangular ground plane 94, as illustrated in FIG. 4. Three of the antenna elements 90 are placed on the corners of the triangular ground plane 94 and one of the antenna elements 92 is placed at the center point of the triangular ground plane. The illustrated shape of the ground plane 94 and the illustrated number of antenna elements 90, 92 may vary depending on the intended applications, as readily appreciated by those skilled in the art.

In one form of a switched beam antenna, the 3 outer antenna elements 90 are passive and the center antenna element 92 is active. The passive elements 90 act together with the active element 92 to form an array. To alter the radiation pattern, the termination impedances of the passive elements 90 are switchable to change the current flowing in these elements. The passive elements 90 become reflectors when shorted to the ground plane 94 using pin diodes, for example. When the passive elements 90 are not shorted to the ground pane 94, they have little effect on the antenna characteristics.

In another embodiment, the antenna elements 90, 92 are all active elements and are combined with independently adjustable phase shifters to provide a phased array antenna. In this embodiment, multiple directional beams as well as an omnidirectional beam in the azimuth direction can be generated.

Essentially, the phased array antenna includes multiple antenna elements and a like number less one of adjustable phase shifters, each respectively coupled to one of the antenna elements. The phase shifters are independently adjustable (i.e., programmable) to affect the phase of respective downlink/uplink signals to be received/transmitted on each of the antenna elements.

A summation circuit is also coupled to each phase shifter and provides respective uplink signals from the subscriber device 16 to each of the phase shifters for transmission from the subscriber device. The summation circuit also receives and combines the respective downlink signals from each of the phase shifters into one received downlink signal provided to the subscriber device 16.

The phase shifters are also independently adjustable to affect the phase of the downlink signals received at the subscriber device 16 on each of the antenna elements. By adjusting phase for downlink link signals, the smart antenna 18 provides rejection of signals that are received and that are not transmitted from a similar direction as are the downlink signals intended for the subscriber device 16.

Figure 5:
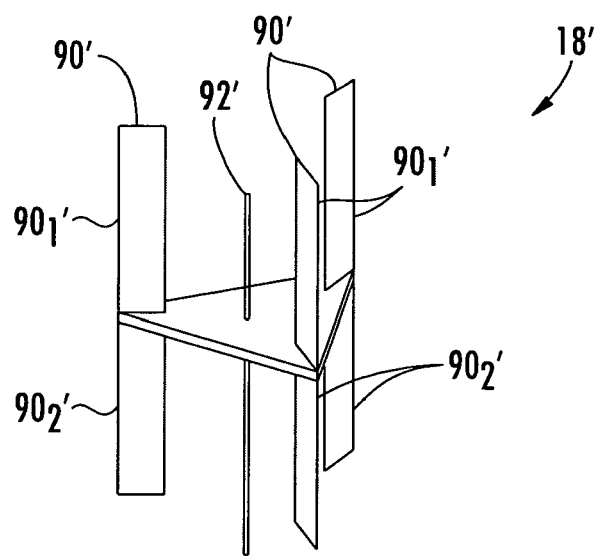
FIG. 5 is a schematic diagram of another embodiment of the smart antenna illustrated in FIG. 4 that includes independently adjustable reactive load elements for providing antenna beams that are directional and steerable in azimuth.

Another embodiment of the smart antenna 18' is illustrated in FIG. 5 where the three antenna elements 90' placed at the corners of the triangular ground plane 94' have independently adjustable reactive load elements in the upper 90$_1$' and lower halves 90$_2$' of the antenna elements. Such an embodiment can provide a plurality of beams that are directional in azimuth and/or elevation.

The independently adjustable reactive load elements include varactors or mechanically insertable RF choke elements, for example, to provide asymmetrical loading on the antenna elements. This results in antenna beams being formed that are directional in elevation.

Figure 6:
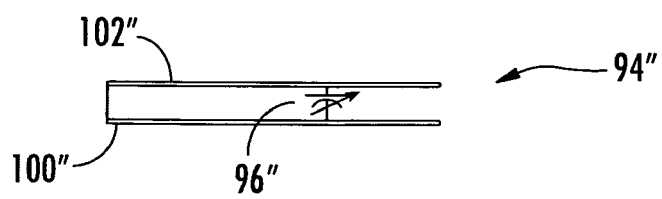
FIG. 6 is a schematic diagram of a partial side view of the ground plane illustrated in FIG. 5 in which a variable reactive load is inserted between two parallel plates thereof for providing antenna beam steering in elevation.

Another embodiment of the ground plane 94" is illustrated in FIG. 6 where a variable edge impedance 96" is inserted in between two parallel plates 100", 102" of the ground plane 94". The variable edge impedance 96" may be varactor load for controlling the edge impedance, and resultantly, the upward or downward tilt angels in elevation of the generated antenna beams. Multiple reactive loads can be placed in the ground plane 94" to approximate a continuous wall of reactance, and the values of the reactance at different locations can be different so the beam tilt can be a function of the azimuth angle, too.

Figure 7:
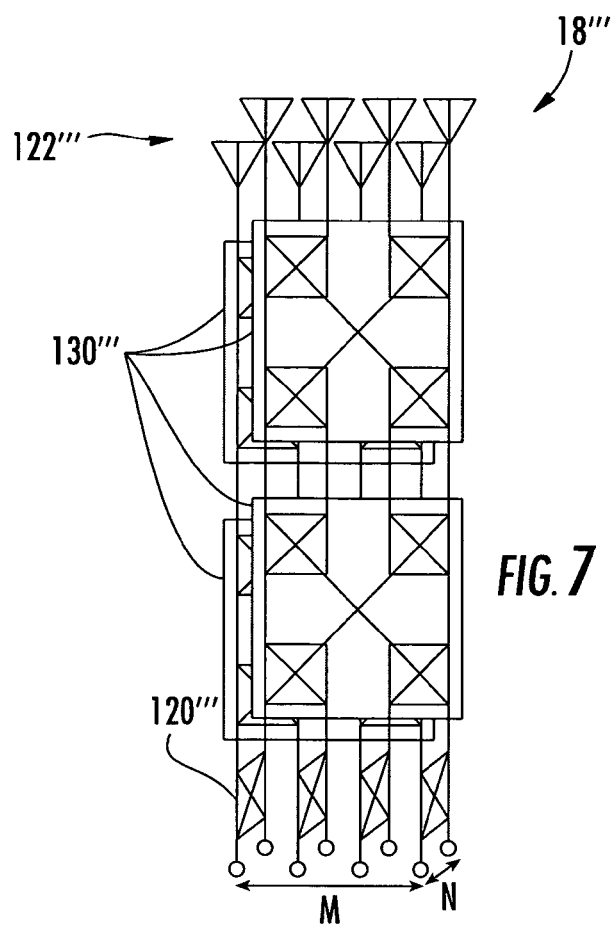
FIG. 7 is a schematic diagram of another embodiment of the smart antenna illustrated in FIG. 1 that includes Shelton-Butler matrices feeding a pair of arrays.
Figure 8:
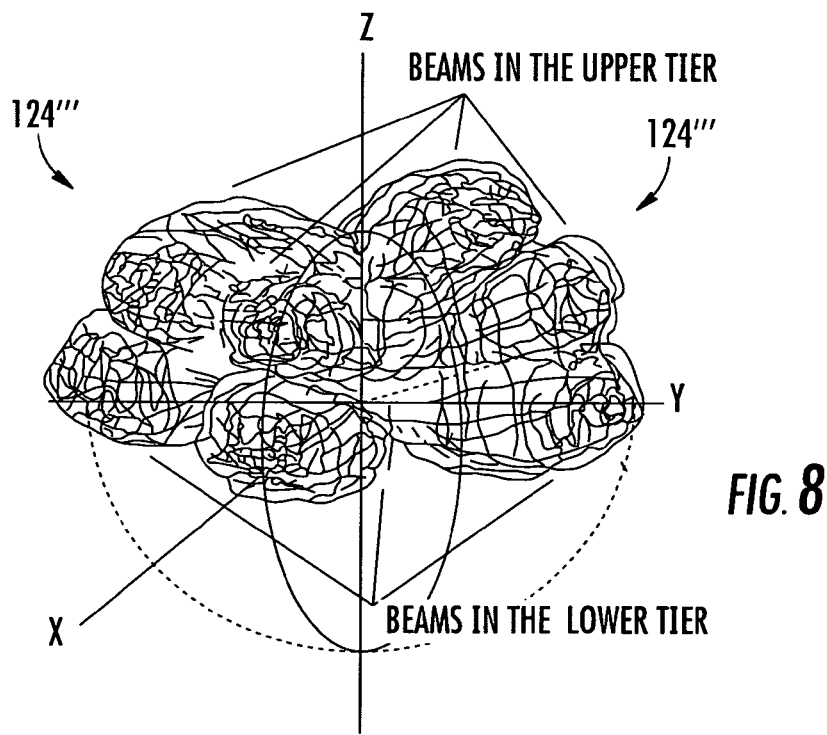
FIG. 8 is a 3-dimensional plot of the directional antenna beams in the azimuth and elevation direction as generated by the smart antenna illustrated in FIG. 7.

Yet another embodiment of the smart antenna 18'" is illustrated in FIG. 7 where a row of elevation Shelton-Butler matrices 120'" feed two or more stacked circular arrays 122'" for creating isolated narrow elevation width beams 124'" as illustrated in FIG. 8. Each circular array 122" is also fed by two Shelton-Butler matrices 130'" in tandem so that the antenna beams are defined pencil beams. The azimuth beam distribution has 3-dB crossovers, and the elevation beams can be designed to have different crossover values. The resultant beams provide highly distinct multiple antenna look patterns, not only in azimuth, but also in elevation. Through port selection, beam direction can be electronically changed.

When the smart antenna 18 is configured as a phased array antenna, to adapt to various orientations with respect to the satellites 12 or to the terrestrial repeater 14, the beam selector 40 includes a controller coupled to each of the adjustable phase shifters. The controller determines an optimal phase setting for each phase shifter. The proper phase of each element may, for example, be determined by monitoring an optimum response to time-division multiplex (TDM) pilot signals transmitted in the TDM-QPSK (in the case of satellite transmission) or TDM-COFDM (in the case of terrestrial repeater transmission) signals. The smart antenna 18 thus acts as a beam former for transmission of signals from the transceiver 42, and acts as a directive antenna for signals received by the transceiver.

Through the use of an array of antenna elements each having a programmable phase, the antenna apparatus is estimated to increase the effective transmit power per bit transmitted by as much as 5 to 12 decibels (dB) for uplink communications, depending on the number N of antenna elements. Thus, the transmit power of the subscriber device 16 could be reduced without sacrificing uplink performance. Also, when used in the receive mode, the received signal quality could be improved in the downlink, and resultantly, the perceptual quality of radio audio signals.

When used in indoor or in other multipath-rich environments where the direct line-of-sight paths from direct satellite links are either weak or unavailable, the directivity of the smart antenna 18 collects usable energy from multiple reflected radio paths to achieve high reception performance in a harsh multipath-rich environment. The directionality of the smart antenna 18 also allows the subscriber device 16 to suppress unwanted or undesired interference coming from certain directions, thereby improving radio performance for the desired links.

With respect to the physical implementation of the smart antenna 18 as discussed above, out of a total of N antenna elements the first N−1 antenna elements are positioned at locations corresponding to corners of an equilateral polygon and the last antenna element is positioned at the center of the polygon ground plane. All of the N elements are aligned orthogonal to a plane defined by the polygon. In such embodiments the smart antennas exhibit beams that are distinguishable as directional or omni-directional beams in the azimuth with essentially identical patterns in the elevation.

Additionally, by employing high-gain directional beams, radio link performance is significantly enhanced when there is a clear line-of-sight radio path between the digital radio signal transmitter (i.e., the satellites 12 or the terrestrial repeater 14) and the subscriber device 16. More particularly, directivity is advantageously provided not only in azimuth but also in elevation, thus providing an optimum approach for enhanced radio performance for a subscriber device receiving signals from the satellites in orbit.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A satellite communication subscriber device comprising:
    a switched beam antenna comprising an active antenna element and a plurality of passive antenna elements for generating a plurality of antenna beams for receiving signals from at least one satellite, and at least a portion of the plurality of antenna beams having different polarizations;
    a receiver comprising a quality metric module for calculating a quality metric on the signals received by each antenna beam;
    a beam selector coupled to said switched beam antenna for selecting the plurality of antenna beams based on selectively changing termination impedances of said plurality of passive antenna elements;
    an antenna steering algorithm module for running an antenna steering algorithm for
        operating said beam selector for scanning a portion of the plurality of antenna beams based upon a known direction of the at least one satellite,
        receiving the calculated quality metrics from said receiver for each scanned antenna beam,
        comparing the calculated quality metrics to a low quality metric threshold, and ignoring antenna beams having calculated quality metrics below the low quality metric threshold;
        comparing the remaining calculated quality metrics to one another for the corresponding antenna beams having quality metrics above the low quality metric threshold; and
        selecting one of the scanned antenna beams based upon the comparing of the remaining calculated quality metrics for continuing to receive signals from the at least one satellite; and
    said antenna steering algorithm module also determines if a rescan is to be performed, and if the rescan is to be performed, then repeats the operating, receiving, comparing and selecting associated with running the antenna steering algorithm.

2. A satellite communication subscriber device according to claim 1 wherein the different polarizations comprise at least one of linear and circular polarizations.

3. A satellite communication subscriber device according to claim 1 wherein the calculated quality metrics comprise at least one of a received signal strength indicator and a signal-to-noise ratio of the received signals.

4. A satellite communication subscriber device according to claim 1 wherein the calculated quality metrics comprise at least one of an error rate and a data throughput of the received signals.

5. A satellite communication subscriber device according to claim 1 wherein the plurality of antenna beams comprise a plurality of directional antenna beams and an omni-directional antenna beam.

6. A satellite communication subscriber device according to claim 5 wherein the antenna steering algorithm operates said beam selector for scanning the plurality of directional antenna beams.

7. A satellite communication subscriber device according to claim 6 wherein the antenna steering algorithm operates said beam selector for selecting the omni-directional antenna beam before scanning the plurality of directional antenna beams, and also for:
    receiving a calculated quality metric from said receiver for the signals received by the omni-directional antenna beam; and
    comparing the calculated quality metric to a scan threshold for determining if the plurality of directional antenna beams are to be scanned.

8. A satellite communication subscriber device according to claim 1 wherein the plurality of antenna beams only comprise a plurality of directional antenna beams.

9. A satellite communication subscriber device according to claim 1 wherein said switched beam antenna generates a plurality of directional antenna beams and an omni-directional antenna beam.

10. A satellite communication subscriber device according to claim 1 wherein said switched beam antenna generates directional antenna beams in an azimuth direction and in an elevation direction.

11. A satellite communication subscriber device according to claim 10 wherein said switched beam antenna also receives signals from at least one terrestrial repeater; and wherein said beam selector selects the directional antenna beams in the azimuth direction for receiving signals from the at least one terrestrial repeater, and selects the directional antenna beams in the elevation direction for receiving signals from the at least one satellite.

12. A satellite communication subscriber device according to claim 1 further comprising a transmitter for transmitting signals from said switched beam antenna.

13. A satellite communication subscriber device comprising:
    a phased array antenna comprising a plurality of active antenna elements for generating a plurality of directional antenna beams in an azimuth direction and in an elevation direction, the plurality of directional antenna beams for receiving signals from at least one of a satellite and a terrestrial repeater, and at least a portion of the plurality of antenna beams having different polarizations;
    a transceiver comprising a quality metric module for calculating a quality metric on the signals received by each directional antenna beam;
    a beam selector coupled to said phased array antenna for selecting the plurality of directional antenna beams in the azimuth and elevation directions based on selectively adjusting a phase associated with each active antenna element;

an antenna steering algorithm module for running an antenna steering algorithm for operating said beam selector for scanning a portion of the plurality of antenna beams based upon a known direction of the at least one satellite, receiving the calculated quality metrics from said transceiver for each scanned antenna beam, comparing the calculated quality metrics to a low quality metric threshold, and ignoring antenna beams having calculated quality metrics below the low quality metric threshold;

comparing the remaining calculated quality metrics to one another for the corresponding antenna beams having quality metrics above the low quality metric threshold; and selecting one of the scanned directional antenna beams in the elevation or azimuth direction based upon the comparing of the remaining calculated quality metrics for continuing to receive signals from the satellite or terrestrial repeater; and said antenna steering algorithm module also determines if a rescan is to be performed, and if the rescan is to be performed, then repeats the operating, receiving, comparing and selecting associated with running the antenna steering algorithm.

14. A satellite communication subscriber device according to claim 13 wherein the calculated quality metrics comprise at least one of a received signal strength indicator and a signal-to-noise ratio of the received signals.

15. A satellite communication subscriber device according to claim 13 wherein the calculated quality metrics comprise at least one of an error rate and a data throughput of the received signals.

16. A satellite communication subscriber device according to claim 13 wherein said phased array antenna also generates an omni-directional antenna beam; and wherein the antenna steering algorithm operates said beam selector for selecting the omni-directional antenna beam before scanning the plurality of directional antenna beams, and also for:

receiving a calculated quality metric from said transceiver for the signals received by the omni-directional antenna beam; and comparing the calculated quality metric to a scan threshold for determining if the plurality of directional antenna beams are to be scanned.

17. A method for operating a satellite communication subscriber device comprising a switched beam antenna comprising an active antenna element and a plurality of passive antenna elements for generating a plurality of antenna beams for receiving signals from at least one satellite, and at least a portion of the plurality of antenna beams having different polarizations, a receiver comprising a quality metric module for calculating a quality metric on the signals received by each antenna beam, a beam selector coupled to the switched beam antenna, and an antenna steering algorithm module for running an antenna steering algorithm, the method comprising:

operating the beam selector for scanning a portion of the plurality of antenna beams based upon a known direction of the at least one satellite, the scanning being based on selectively changing termination impedances of the plurality of passive antenna elements;

receiving the calculated quality metrics from the receiver for each scanned antenna beam;

comparing the calculated quality metrics to a low quality metric threshold, and ignoring antenna beams having calculated quality metrics below the low quality metric threshold;

comparing the remaining calculated quality metrics to one another for the corresponding antenna beams having quality metrics above the low quality metric threshold;

selecting one of the scanned antenna beams based upon the comparing of the remaining calculated quality metrics for continuing to receive signals from the at least one satellite; and determining if a rescan is to be performed, and if the rescan is to be performed, then repeating the operating, receiving, comparing and selecting.

18. A method according to claim 17 wherein the calculated quality metrics comprise at least one of a received signal strength indicator, a signal-to-noise ratio of the received signals, an error rate and a data throughput of the received signals.

19. A method according to claim 17 wherein the plurality of antenna beams comprise a plurality of directional antenna beams and an omni-directional antenna beam.

20. A method according to claim 17 wherein the antenna steering algorithm operates the beam selector for selecting the omni-directional antenna beam before scanning the plurality of directional antenna beams, and further comprising:

receiving a calculated quality metric from the receiver for the signals received by the omni-directional antenna beam; and comparing the calculated quality metric to a scan threshold for determining if the plurality of directional antenna beams are to be scanned.

21. A method according to claim 17 wherein the switched beam antenna generates directional antenna beams in an azimuth direction and in an elevation direction.

22. A method according to claim 21 wherein the switched beam antenna also receives signals from at least one terrestrial repeater; and wherein the beam selector selects the directional antenna beams in the azimuth direction for receiving signals from the at least one terrestrial repeater, and selects the directional antenna beams in the elevation direction for receiving signals from the at least one satellite.

* * * * *